(12) United States Patent
Mercer et al.

(10) Patent No.: US 12,516,639 B2
(45) Date of Patent: *Jan. 6, 2026

(54) INTELLIGENT FUEL STORAGE AND BLENDING SYSTEM

(71) Applicants: Michael D. Mercer, Edmond, OK (US); Ronald R. Mercer, Edmond, OK (US)

(72) Inventors: Michael D. Mercer, Edmond, OK (US); Ronald R. Mercer, Edmond, OK (US)

( * ) Notice: Subject to any disclaimer, the term of this patent is extended or adjusted under 35 U.S.C. 154(b) by 18 days.

This patent is subject to a terminal disclaimer.

(21) Appl. No.: 18/391,908

(22) Filed: Dec. 21, 2023

(65) Prior Publication Data

US 2024/0125277 A1 Apr. 18, 2024

Related U.S. Application Data

(63) Continuation of application No. 17/949,899, filed on Sep. 21, 2022, now Pat. No. 11,885,270.

(Continued)

(51) Int. Cl.
*F02D 19/06* (2006.01)
*F02D 19/08* (2006.01)
(Continued)

(52) U.S. Cl.
CPC ..... *F02D 19/0665* (2013.01); *F02D 19/0644* (2013.01); *F02D 19/085* (2013.01); *F02D 29/06* (2013.01); *F17C 3/005* (2013.01); *F17C 5/007* (2013.01); *F17C 2221/012* (2013.01); *F17C 2221/033* (2013.01); *F17C 2223/0123* (2013.01)

(58) Field of Classification Search
None
See application file for complete search history.

(56) References Cited

U.S. PATENT DOCUMENTS 5,207,530 A * 5/1993 Brooks ................... F17C 1/007
405/53
5,787,940 A 8/1998 Bonn et al.
(Continued)

FOREIGN PATENT DOCUMENTS

CA 2693567 A1 * 10/2010 ............... B67D 7/04
CN 212819205 U * 3/2021
(Continued)

*Primary Examiner* — Kevin R Steckbauer
(74) *Attorney, Agent, or Firm* — Hall Estill Law Firm

(57) ABSTRACT

Method and apparatus for blending first and second fuels for use by a combustion mechanism, such as a motor vehicle. The first and second fuels are stored in storage vessels of a fuel storage pod in a fuel storage ratio of total respective volumes established by a storage controller circuit of a storage module responsive to a predicted demand level. A blended fuel ratio is selected by a blend controller circuit of a blend module in response to an imminent demand parameter of a selected combustion mechanism, with the blended fuel ratio being different from the fuel storage ratio. A blend of the first and second fuels is thereafter dispensed to the selected combustion mechanism at the blended fuel ratio. The first fuel may be hydrogen (H2), and the second fuel may be a selected hydrocarbon, such as propane, butane, methane, hexane, gasoline or diesel.

20 Claims, 5 Drawing Sheets

Related U.S. Application Data

(60) Provisional application No. 63/247,022, filed on Sep. 22, 2021.

(51) Int. Cl.
  *F02D 29/06* (2006.01)
  *F17C 3/00* (2006.01)
  *F17C 5/00* (2006.01)

(56) References Cited

U.S. PATENT DOCUMENTS

| | | | | |
|---|---|---|---|---|
| 6,890,671 | B2* | 5/2005 | Roche | H01M 8/04089 |
| | | | | 429/432 |
| 7,128,103 | B2* | 10/2006 | Mitlitsky | H01M 8/04089 |
| | | | | 141/82 |
| 7,168,464 | B2* | 1/2007 | Diggins | F17C 7/02 |
| | | | | 141/105 |
| 7,270,209 | B2* | 9/2007 | Suess | B60K 15/03006 |
| | | | | 224/538 |
| 7,497,191 | B2* | 3/2009 | Fulton | H01M 8/0606 |
| | | | | 123/492 |
| 7,850,034 | B2* | 12/2010 | Munshi | B60K 15/03006 |
| | | | | 220/560.04 |
| 7,861,696 | B2* | 1/2011 | Lund | F02C 9/40 |
| | | | | 123/575 |
| 7,966,802 | B2 | 6/2011 | Szepek et al. | |
| 8,091,536 | B2 | 1/2012 | Munshi et al. | |
| 8,301,359 | B1* | 10/2012 | Sagar | G05B 19/042 |
| | | | | 123/1 A |
| 8,315,788 | B2* | 11/2012 | Surnilla | G01C 21/26 |
| | | | | 701/123 |
| 8,418,732 | B2* | 4/2013 | Cohen | G05D 11/132 |
| | | | | 141/94 |
| 8,459,213 | B2* | 6/2013 | Moriarty | B60T 1/10 |
| | | | | 123/3 |
| 8,469,009 | B2 | 6/2013 | Munshi et al. | |
| 8,583,350 | B1* | 11/2013 | Sagar | G05B 19/042 |
| | | | | 290/51 |
| 8,583,360 | B2 | 11/2013 | Sagar | |
| 8,613,201 | B2 | 12/2013 | Bayliff et al. | |
| 8,751,140 | B2* | 6/2014 | Surnilla | G01C 21/26 |
| | | | | 701/123 |
| 9,133,011 | B2* | 9/2015 | McAlister | H01M 8/04753 |
| 9,284,178 | B2* | 3/2016 | Donnelly | B60S 5/02 |
| 9,287,178 | B2 | 3/2016 | Li et al. | |
| 9,309,811 | B2* | 4/2016 | Swann | F02C 9/40 |
| 9,359,568 | B2 | 6/2016 | Baustian et al. | |
| 9,377,202 | B2* | 6/2016 | Menon | F23R 3/36 |
| 9,739,419 | B2* | 8/2017 | Donnelly | B67D 7/04 |
| 9,739,919 | B2 | 8/2017 | Zhang et al. | |
| 9,796,910 | B2 | 10/2017 | Nevison | |
| 10,195,583 | B2 | 2/2019 | Costantino et al. | |
| 10,337,669 | B2 | 7/2019 | Mercer et al. | |
| 10,340,693 | B2 | 7/2019 | Lansing et al. | |
| 10,837,601 | B2* | 11/2020 | Mercer | B65G 5/00 |
| 11,220,427 | B2* | 1/2022 | Lugtigheid | C01B 3/065 |
| 11,525,544 | B2* | 12/2022 | Clarke | H01M 8/04201 |
| 11,680,684 | B2 | 6/2023 | Mercer et al. | |
| 11,681,307 | B1* | 6/2023 | Chedsey | E21B 43/295 |
| | | | | 137/14 |
| 11,828,417 | B2* | 11/2023 | Clarke | B60L 53/80 |
| 11,852,082 | B2* | 12/2023 | Frey | F23R 3/36 |
| 11,885,270 | B2* | 1/2024 | Mercer | F02D 19/023 |
| 11,927,144 | B2* | 3/2024 | Mercer | F02D 19/0671 |
| 11,981,357 | B2* | 5/2024 | Fisher | B61C 17/12 |
| 12,331,885 | B2* | 6/2025 | Clarke | F17C 13/083 |
| 2003/0113602 | A1* | 6/2003 | Nau | B60L 58/30 |
| | | | | 180/68.5 |
| 2004/0121201 | A1* | 6/2004 | Roche | H01M 8/04089 |
| | | | | 429/416 |
| 2006/0014070 | A1* | 1/2006 | Kaye | H01M 8/04201 |
| | | | | 429/513 |
| 2006/0033322 | A1* | 2/2006 | Suess | B60K 15/07 |
| | | | | 280/830 |
| 2006/0071016 | A1* | 4/2006 | Diggins | F17C 7/02 |
| | | | | 222/3 |
| 2006/0154134 | A1 | 7/2006 | Vinsant | |
| 2008/0057359 | A1 | 3/2008 | Venkataraman et al. | |
| 2009/0005903 | A1* | 1/2009 | Winsness | G06Q 99/00 |
| | | | | 700/239 |
| 2009/0064586 | A1* | 3/2009 | Munshi | F17C 5/04 |
| | | | | 48/199 FM |
| 2009/0320789 | A1* | 12/2009 | Lund | F02D 19/0665 |
| | | | | 123/299 |
| 2010/0000434 | A1* | 1/2010 | Pristash | F42C 11/008 |
| | | | | 102/200 |
| 2010/0107994 | A1* | 5/2010 | Moriarty | F03G 7/08 |
| | | | | 310/156.01 |
| 2011/0126545 | A1* | 6/2011 | Loeven, II | F23R 3/36 |
| | | | | 60/39.281 |
| 2011/0137470 | A1* | 6/2011 | Surnilla | G01C 21/26 |
| | | | | 700/282 |
| 2012/0079761 | A1* | 4/2012 | Turner | C10L 1/02 |
| | | | | 44/452 |
| 2013/0008173 | A1 | 1/2013 | Fletcher et al. | |
| 2013/0008557 | A1* | 1/2013 | Cohen | G05D 11/132 |
| | | | | 141/105 |
| 2013/0112313 | A1* | 5/2013 | Donnelly | F17C 5/06 |
| | | | | 141/98 |
| 2014/0043932 | A1* | 2/2014 | Russell | C10L 3/10 |
| | | | | 366/182.4 |
| 2014/0234735 | A1* | 8/2014 | Zhang | C25B 1/04 |
| | | | | 429/422 |
| 2014/0263401 | A1* | 9/2014 | McAlister | H01M 8/04425 |
| | | | | 222/23 |
| 2015/0100219 | A1* | 4/2015 | Swann | F02C 3/20 |
| | | | | 701/100 |
| 2015/0114009 | A1* | 4/2015 | Gates | F25J 1/0022 |
| | | | | 62/50.1 |
| 2015/0114351 | A1* | 4/2015 | Lund | F02M 43/00 |
| | | | | 123/457 |
| 2016/0195220 | A1* | 7/2016 | Donnelly | B67D 7/04 |
| | | | | 141/94 |
| 2016/0354742 | A1* | 12/2016 | Russell | B01F 35/2217 |
| 2018/0223746 | A1* | 8/2018 | Mack | G01C 21/166 |
| 2019/0106316 | A1* | 4/2019 | Van Vliet | B67D 7/0401 |
| 2020/0055730 | A1* | 2/2020 | Lugtigheid | B67D 7/04 |
| 2022/0009648 | A1* | 1/2022 | Clarke | B64D 37/06 |
| 2022/0073111 | A1* | 3/2022 | Fisher | B61C 17/12 |
| 2022/0074548 | A1* | 3/2022 | Clarke | B60L 53/80 |
| 2022/0081288 | A1* | 3/2022 | Lugtigheid | B67D 7/04 |
| 2022/0090739 | A1* | 3/2022 | Stager | F17C 7/04 |
| 2022/0205590 | A1* | 6/2022 | Clarke | B64D 37/16 |
| 2022/0333743 | A1* | 10/2022 | Mercer | F17C 13/06 |
| 2023/0086470 | A1* | 3/2023 | Mercer | F17C 5/007 |
| | | | | 123/575 |
| 2023/0088217 | A1* | 3/2023 | Mercer | F17C 5/007 |
| | | | | 141/94 |
| 2023/0212990 | A1* | 7/2023 | Frey | F23R 3/36 |
| | | | | 60/39.281 |
| 2023/0213151 | A1 | 7/2023 | Mercer et al. | |
| 2023/0243474 | A1* | 8/2023 | Clarke | F17C 1/00 |
| | | | | 244/135 R |
| 2023/0246211 | A1* | 8/2023 | Montgomery | F02M 21/0206 |
| | | | | 429/444 |
| 2023/0250923 | A1 | 8/2023 | Mercer et al. | |
| 2023/0383703 | A1* | 11/2023 | Neutzler | F02D 19/0628 |
| 2023/0400154 | A1* | 12/2023 | Cordova | F17C 7/04 |
| 2024/0068415 | A1* | 2/2024 | Frey | F23R 3/36 |
| 2024/0125277 | A1* | 4/2024 | Mercer | F02D 19/0644 |
| 2024/0125278 | A1* | 4/2024 | Mercer | F02D 19/0644 |
| 2024/0300321 | A1* | 9/2024 | Khadiya | B60K 15/03006 |
| 2025/0043739 | A1* | 2/2025 | Mercer | F02D 29/06 |

FOREIGN PATENT DOCUMENTS

| | | | | |
|---|---|---|---|---|
| CN | 113864016 A | | 10/2021 | |
| CN | 114529056 A | * | 5/2022 | G06Q 10/067 |
| CN | 217763522 U | * | 11/2022 | |

(56) References Cited

FOREIGN PATENT DOCUMENTS

| CN | 115796323 | A | * | 3/2023 | |
|---|---|---|---|---|---|
| EP | 2979743 | A1 | * | 2/2016 | ............. C01B 3/501 |
| EP | 2979743 | B1 | * | 10/2019 | ............. C01B 3/501 |
| ES | 2764389 | T3 | * | 6/2020 | ............. B01D 53/22 |
| JP | 2000017470 | A | * | 1/2000 | |
| JP | 2012082791 | A | * | 4/2012 | |
| JP | 5735252 | B2 | * | 6/2015 | |
| JP | 2021172631 | A | * | 11/2021 | |
| WO | WO-2010122296 | A1 | * | 10/2010 | ................ C10L 1/02 |
| WO | WO-2011050289 | A2 | * | 4/2011 | ................ F03G 7/08 |

* cited by examiner

INTELLIGENT FUEL STORAGE AND BLENDING SYSTEM

RELATED APPLICATIONS

The present application is a continuation of co-pending U.S. patent application Ser. No. 17/949,899 filed Sep. 21, 2022, which in turn makes a claim of domestic priority under 35 U.S.C. 119(e) to U.S. Provisional Patent Application No. 63/247,022 filed Sep. 22, 2021. The contents of both of these applications are hereby incorporated by reference.

SUMMARY

Various embodiments of the present disclosure are generally directed to a method and apparatus for blending first and second fuels for use by a combustion mechanism, such as a motor vehicle.

Without limitation, in some embodiments the first and second fuels are stored in storage vessels of a fuel storage pod in a fuel storage ratio of total respective volumes established by a storage controller circuit of a storage module responsive to a predicted demand level. A blended fuel ratio is selected by a blend controller circuit of a blend module in response to an imminent demand parameter of a selected combustion mechanism, with the blended fuel ratio being different from the fuel storage ratio. A blend of the first and second fuels is thereafter dispensed to the selected combustion mechanism at the blended fuel ratio. The first fuel may be hydrogen (H2), and the second fuel may be a selected hydrocarbon, such as propane, butane, methane, hexane, gasoline or diesel.

These and other features and advantages of various embodiments can be understood from a review of the following detailed description in conjunction with a review of the associated drawings.

DETAILED DESCRIPTION

Assorted embodiments of the current disclosure are generally directed to a system that intelligently stores and supplies fuels at prescribed pressures and blends to provide optimal fuel usage.

The generation of electricity has evolved with the incorporation of green sources of energy, such as solar, biomass, wind, and tidal harnessing. Meanwhile, the electrical grid that delivers power to consumers has evolved with sophisticated pricing and selection models that emphasize the ability of an electrical power generator to provide dynamic output. Hence, there is a goal to intelligently incorporate green sources of energy with electrical power generators to deliver power optimized for emissions and the sophisticated pricing and selection models often utilized by large-scale electrical power plants.

Accordingly, various embodiments employ a storage module that generates and executes a storage strategy involving the intelligent and dynamic storage of at least two different gases that can be blended into a fuel ratio by a blend module to allow electrical power generation with optimized efficiency, emissions, cost, and timing. The ability to store gases created from green sources of energy provide economical and environmentally friendly solutions while allowing downstream electrical power generators to enjoy increased performance due to the blend of the stored gases.

Figure 1:
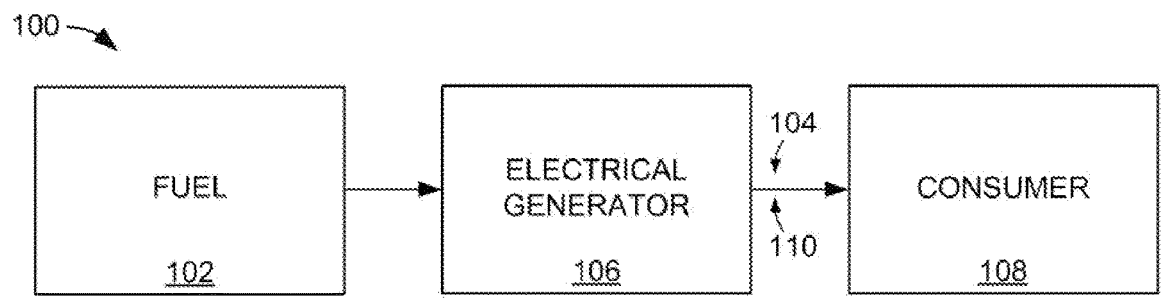
FIG. 1 is a block representation of an example electrical power generation environment in which assorted embodiments can be practiced.

FIG. 1 depicts portions of an example environment 100 in which embodiments of an energy utilization system can be practiced. The delivery of one or more fuels 102, such as coal, natural gas, steam, hydrogen, gasoline, or diesel, allows the conversion of fuel into electrical energy 104 by one or more generators 106. The consistent supply of fuels 102 over time provides electrical power to downstream consumers 108 via an electrical distribution grid 110. However, the cost and supply of fuels 102 can vary over time, which jeopardizes the performance and consistency of electrical energy 104 delivery to consumers 108.

As technology has allowed natural forces with intermittent supply, such as wind, water, and sun, to be converted to electricity, the emphasis on electrical energy 104 generation from combusted, or otherwise consumed, fuels 102 has been reduced. Yet, greater numbers of consumers 108 are connecting to the grid 110 and utilizing greater amounts of electricity, such as to power electrically powered vehicles. It is noted that the supply of blended fuels to an electrical generator is not required or limiting as some embodiments provide blended fuels to a combustion mechanism, such as a vehicle engine or heater.

Figure 2:
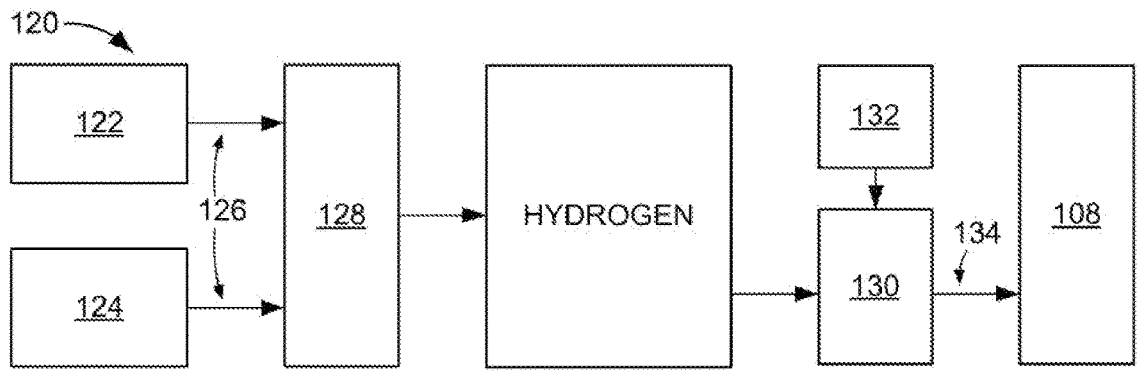
FIG. 2 depicts a block representation of an example electrical power generation system capable of being optimized in various embodiments.

FIG. 2 depicts an example energy utilization system 120 that employs natural forces to supplement fuel-consuming electricity generation. As shown, a wind turbine 122 and solar panel 124 respectively convert natural forces into electrical energy 126. While the produced electrical energy 126 may be consumed immediately, restrictions on electrical energy transmission often limit the amount of energy that can be consumed. Thus, some, or all, of the electrical energy 126 can be employed in an electrolysis operation 128 where water is converted into separate hydrogen ($H_2$) and oxygen ($O_2$) gases that can be stored and utilized at a later time. It is contemplated that some electrolysis operations 128 vent produced oxygen gas to simply store produced hydrogen, which can be more easily combusted than oxygen.

However, the storage and transportation of hydrogen gas is riddled with logistic complications and safety considerations that are inefficient. Despite such inefficiency, it is contemplated that hydrogen can be supplied to an electrical energy generator 130 alone, or in combination with other fuels 132, such as natural gas, to be consumed in the creation of electricity 134 that is delivered to downstream consumers 108. The supplementation of other fuels 132 with hydrogen gas produced from natural forces can be beneficial, but can be cost prohibitive, particularly when the cost of maintenance of the energy capturing devices (122/124) is added to the transportation and storage of hydrogen.

Figure 3:
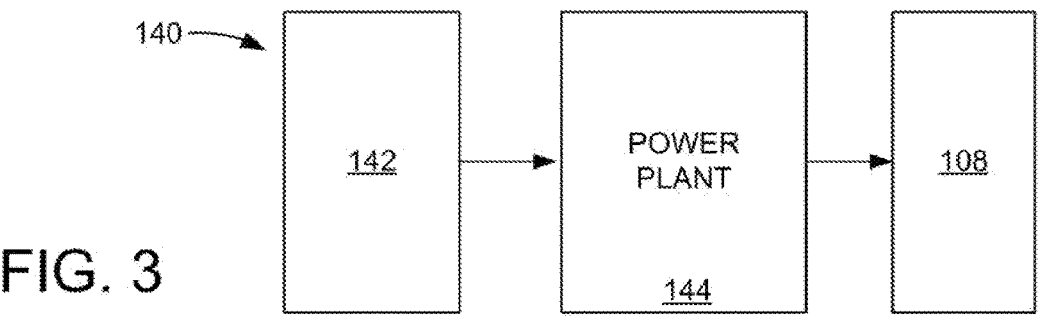
FIG. 3 represents a block representation of portions of an example electrical power generation system arranged in accordance with some embodiments.

FIG. 3 depicts a block representation of portions of an example energy utilization system 140 where one or more fuels 142 are supplied to a combustion mechanism 144, such as a power plant or vehicle, to be converted into electrical/mechanical energy that can be employed by downstream consumers 108. While the combustion mechanism 144 may produce electricity at any volume, pricing and availability models imposed by regulatory agencies create dynamic profitability structures for the translation of fuels 142 into electricity. Hence, the static capabilities of power plant combustion mechanisms 144 to produce electricity in certain volumes at unmitigated costs limits the profitability, even with the inclusion of fuels sourced from cheaper origins, such as hydroelectric, wind, and solar devices that have intermittent supply.

Figure 4:
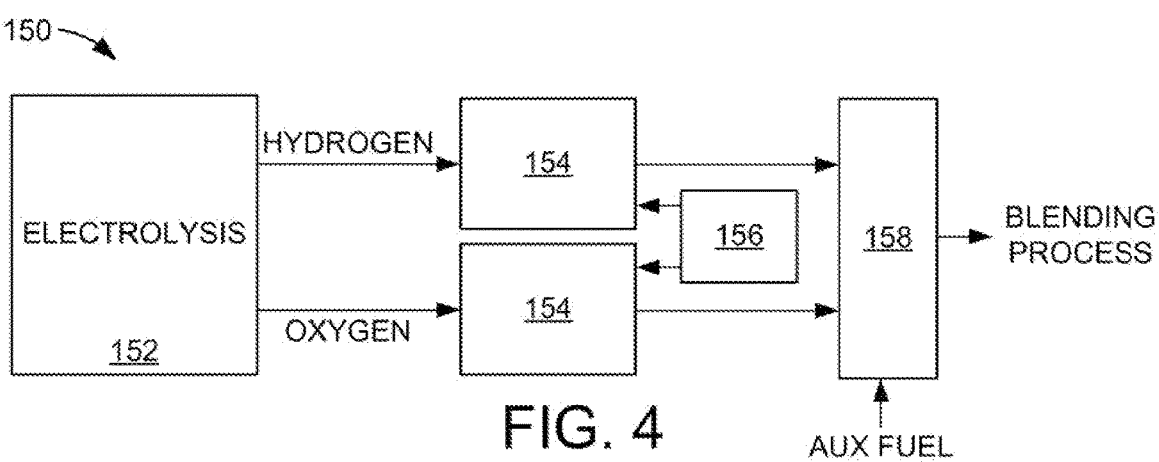
FIG. 4 conveys a block representation of an example power utilization system configured in accordance with assorted embodiments.

FIG. 4 depicts a block representation of an example energy utilization system 150 configured in accordance with various embodiments to provide optimized delivery of fuels and generation of electricity by a fuel combustion mechanism 144. Although not required or limiting, electrolysis 152 can be used to convert electrical power into separate hydrogen and oxygen gases that are safely transported close to the mechanism 144 where they are respectively stored in interconnected storage pods 154. A storage module 156 intelligently manages the volume and pressure of the respective gases to ensure the availability for the power plant 144.

It is contemplated that hydrogen and oxygen are delivered directly to the combustion mechanism 144, but some embodiments blend the respective gases to provide a fuel ratio selected by a blend module 158 that provides optimal electrical power generation, emissions, timing, and cost. As a result of the intelligent storage and blending of gases produced from natural forces, the combustion mechanism 144 can enjoy cost mitigation of other fuels, such as natural gas, along with the ability to employ dynamic electrical power generation timing and volume due to the selected fuel blend. In some embodiments, the storage module 156 selects where to deliver gases, such as to vehicles powered by hydrogen.

Figure 5:
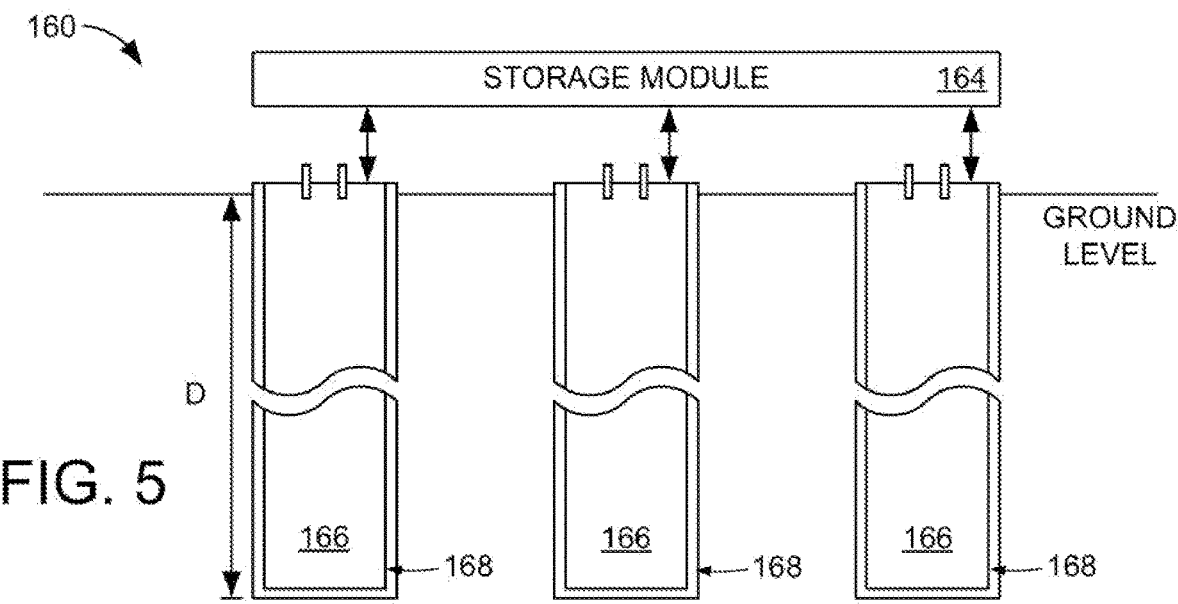
FIG. 5 depicts a line representation of portions of an example power utilization system employed in accordance with various embodiments.

FIG. 5 illustrates portions of an example energy utilization system 160 where a storage pod 162 is connected to a storage module 164 that employs at least a controller and storage circuit to generate a storage strategy that is executed to maintain the availability of at least two different gases, such as hydrogen and oxygen, for a downstream power plant. Although not required or limiting, a storage pod 162 can consist of multiple individual vessels 166 that are each extend a depth (D) underground for safety and efficiency of space (e.g., "subterranean vessels"). That is, above ground tanks/vessels may be utilized, but take up large volumes of space and provide safety concerns that are highly mitigated by the use of subterranean vessels (e.g., positioning the vessels 166 below ground).

The respective vessels 166 may be constructed with interchangeable sleeves 168 that allow for the mitigation of material embrittlement while providing an increased degree of safety compared to vessels without interchangeable internal materials. The separation of vessels 166 allows the storage module 164 to alter what gases is stored and at what pressure the gas is to be kept, which provides the ability to dynamically adjust to power plant demand to increase electricity generation efficiency and performance while decreasing emissions compared to combustion of a single fuel source.

Figure 6:
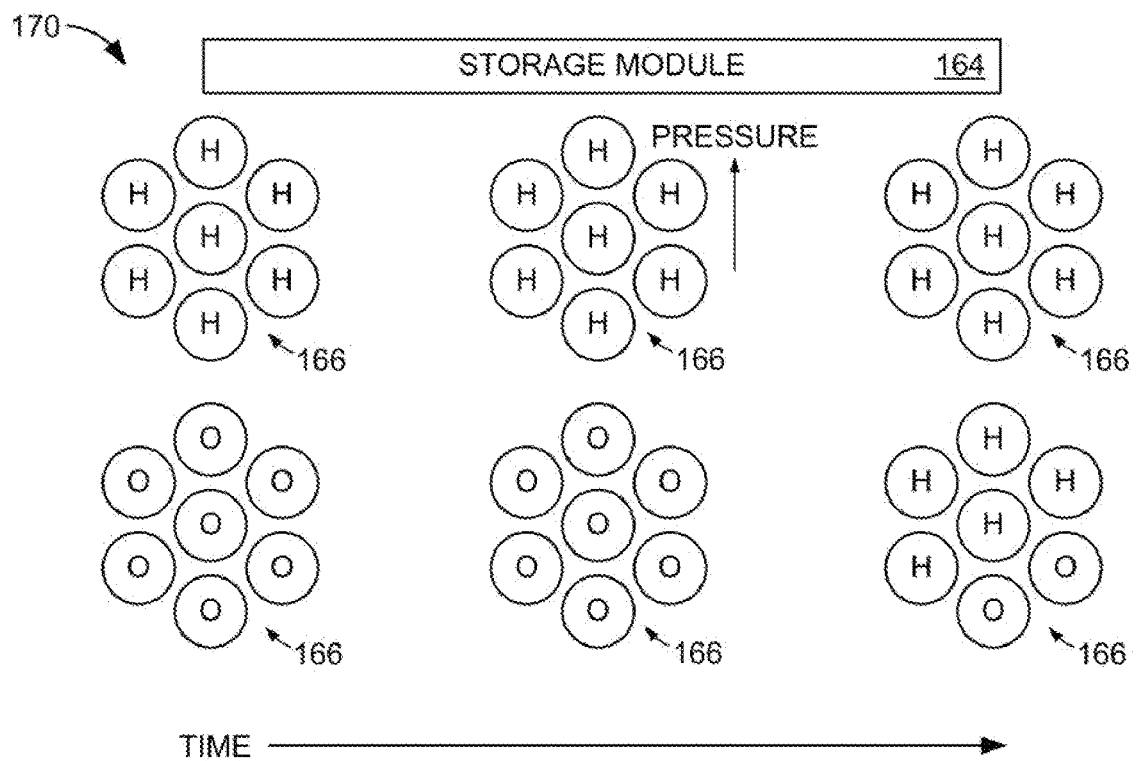
FIG. 6 conveys a line representation of portions of an example power utilization system operated in accordance with some embodiments.

FIG. 6 depicts an example storage pod 170 utilized by a storage module 164 over time in accordance with some embodiments. Initially, the storage module 164 directs equal volumes of hydrogen (H) and oxygen (O) to be stored in the respective vessels 166. In response to demand, cost, and/or vessel maintenance, the storage module 164 can choose to store more hydrogen than oxygen by increasing the pressure of some vessels and/or utilizing more vessels 166 for hydrogen than for oxygen. The storage module 164 may further adjust the ratio of volume of stored hydrogen to volume of stored oxygen by changing the number of vessels 166 storing hydrogen, as shown.

Figure 7:
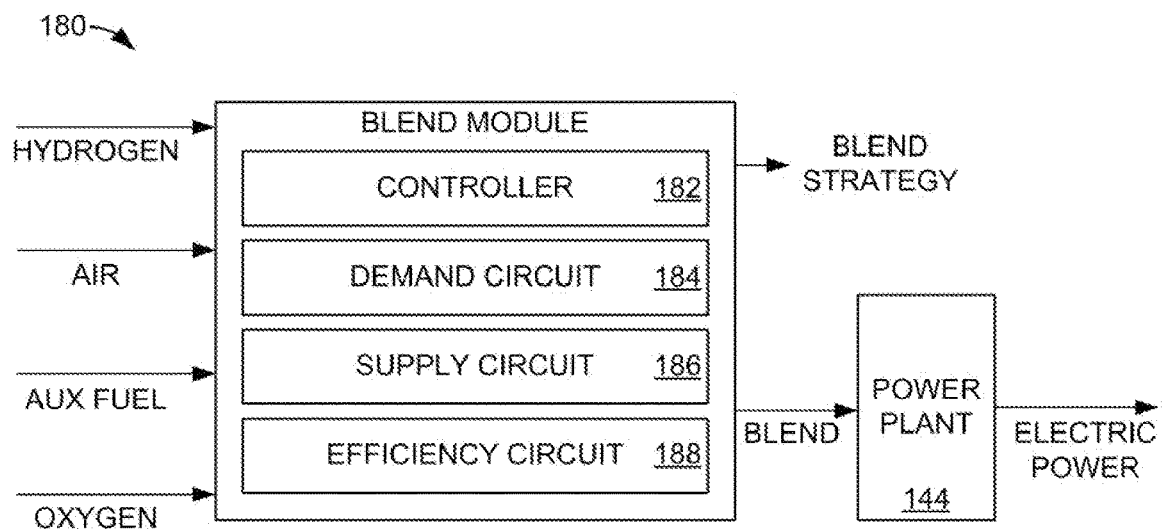
FIG. 7 shows a block representation of portions of an example power utilization system configured in accordance with assorted embodiments.

By intelligently altering the pressure and/or gas stored in a vessel, the storage module 164 can mitigate vessel embrittlement and adapt to changing electricity generation conditions, such as cost, demand, and timing. The addition of intelligent blending of gases can complement the intelligent storage of gases to optimize the operation of a power plant. FIG. 7 depicts a block representation of an example blend module 180 that can employ a controller 182 to generate and execute a blending strategy that provides a predetermined fuel ratio to one or more electrical energy generators.

The blend module 180 can have a demand circuit 184 that evaluates past, current, and predicted future demand for fuels to provide the blend strategy with prescribed volumes of fuels that can be consistently and reliably supplied. The demand circuit 184 allows the blend strategy to be practical and executable without undue delay from lack of fuel supply. Use of the demand circuit 184, in some embodiments, can manage fuel nominations, which can provide a physical hedge. The accurate understanding of dynamic demand, via the demand circuit 184, can allow the blend module 180 to selectively take fuel from a supply line and/or existing tank to meet demand with proper fuel volume, fuel pressure, and mitigated fuel costs, such as during peak demand conditions.

A supply circuit 186 can operate with the storage module of a system to determine the real-time and future fuel supply capabilities of a system, which corresponds with the ability of the blend module 180 to provide a fuel ratio prescribed by the blending strategy. The fuel ratio that provides optimized electrical generation efficiency and cost can be determined by an efficiency circuit 188 that evaluates environmental conditions as well as the operating performance of an electrical generator. The efficiency circuit 188 can set different fuel ratios correlating to any number of factors, such as cost of auxiliary fuel (natural gas), dynamic operating parameters of a generator, and humidity of ambient air, to provide fuel at minimal cost without jeopardizing electrical generation timing, emissions, speed, or efficiency.

With the blending strategy proactively setting different fuel ratios correlated to different detected, or predicted, electrical generation parameters, along with the consideration for fuel cost, emissions, electrical grid selection, and electricity pricing models, the blend module 180 can provide quick and dynamic adjustments to the storage and/or supply of fuels to maintain electrical power generation at the lowest cost and highest possible efficiency. The blend may also be optimized for other machines employing turbines, such as jet engines, to increase operational efficiency while decreasing fuel cost.

Alternatively, the blending strategy can be optimized for non-electrical power plant usage, such as in internal combustion engines, locomotives, or industrial equipment. In other words, the blend of fuels and air can be optimized by the blend module for combustion engines due to the relatively high octane rating of auxiliary fuels, such as natural gas, and the ability to mitigate unburned hydrocarbons by blending pure hydrogen. It is noted that hydrogen burns relatively quickly for a large concentration range, such as 5-75%, which results in a faster, more complete, and more efficient burn for combustion engines of all displacements. As an another non-limiting example, the blend could be optimized for large vessels, such as trains or ships, by utilizing more pure oxygen that causes diesel engines to operate more efficiently and with reduced emissions.

Figure 8:
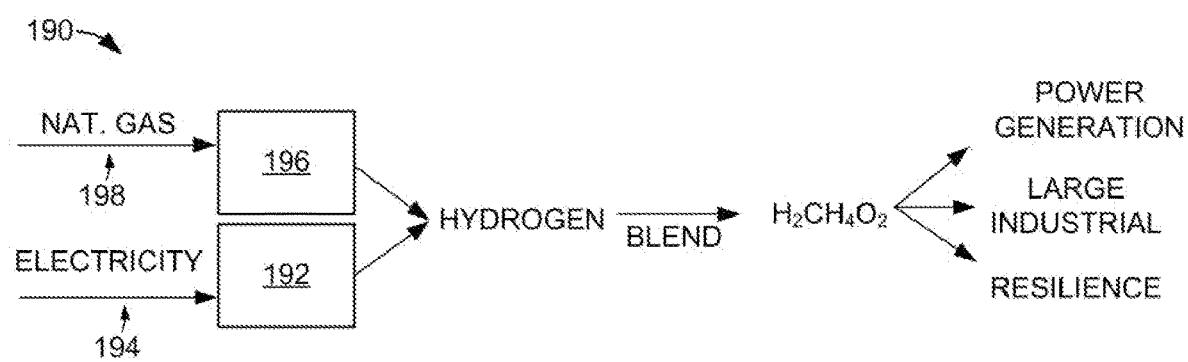
FIG. 8 depicts a block representation of a blending procedure that can be carried out by an energy utilization system in some embodiments.

FIG. 8 depicts a block representation of an example blending procedure 190 that can be carried out by the blend module 180 in accordance with some embodiments. Through the transformation of water into hydrogen via electrolysis 192 from electricity from natural forces 194, such as wind, water, geothermal, or solar energy, or via steam methane reforming 196 from one or more natural gas sources 198, the blend strategy is conducted to create a predetermined mixture of different gases, which can be defined as a molar gas fraction.

The predetermined blend of gases can be selected with respect to the operational parameters of a power generator, such as a blend that decreases maintenance demand or operational stress on generator components, or selected with respect to the cost per unit of electricity generated. While not limiting, the intelligent modification of the mixture of gases in accordance with a predetermined blending strategy allows for optimal cost, operational efficiency, or speed for various purposes, such as power generation, industrial combustion, residential heating, and vehicle operation.

Figure 9:
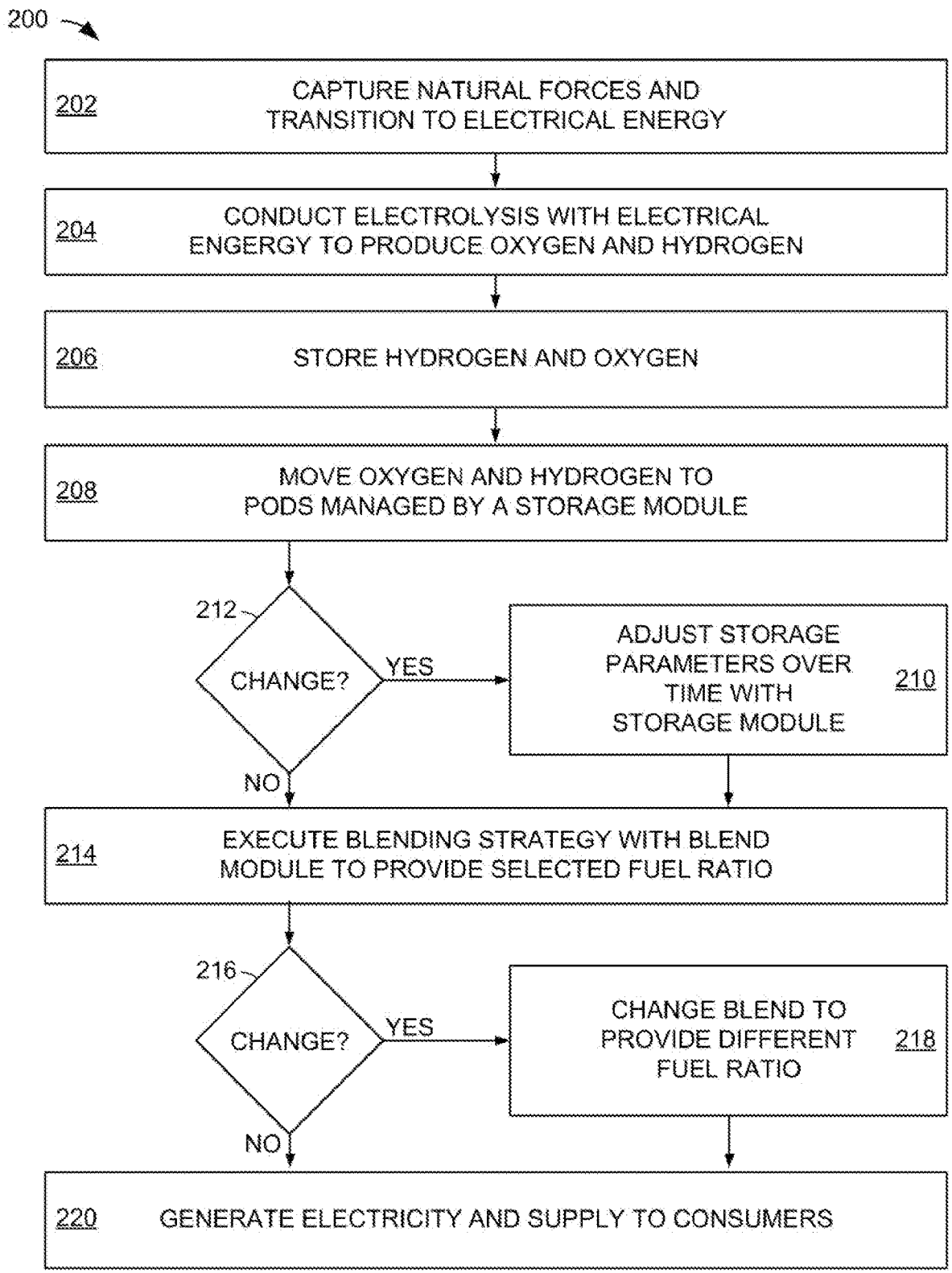
FIG. 9 shows an example power utilization routine that may be employed by the various embodiments disclosed herein.

FIG. 9 is a flowchart of an example energy utilization routine 200 that can employ assorted embodiments of FIGS. 1-8. Natural forces are captured in step 202 and transitioned into electrical energy that is immediately utilized in one or more electrolysis operations in step 204 to create hydrogen gas and oxygen gas that are each captured and stored in step 206. It is noted that additional fuels, such as propane, butane, methane, and hexane, can be concurrently stored in storage vessels of one or more storage pods.

Via one or more transportation means, step 208 moves the stored gases each to vessels of a storage pod connected to a storage module. The storage module dynamically adjusts the gas storage parameters, such as storage pressure and/or storage ratio of stored gas volumes, over time in step 210 in response to decision 212 determining a change in supply, cost, and/or demand is imminent or predicted. At the conclusion of step 210, or in the event decision 212 does not prompt a change in storage parameters, step 214 executes a blending strategy to provide a fuel ratio from the storage pod to a power plant to allow for the generation of electrical energy. Decision 216 evaluates if changes to electricity demand and/or pricing has changed. If so, step 218 changes to a different fuel ratio of the blending strategy.

It is also contemplated that step 218 can alter the fuel ratio in response to other detected or predicted conditions, such as supply of fuel, cost of fuel, or operating parameters of power plant generators. With the optimal fuel ratio, step 220 can proceed to generate electricity that is supplied to consumers via a power grid. Accordingly, the blend module can provide a dynamic fuel ratio that adapts to changing supply, demand, and use conditions to ensure maximum fuel delivery performance at the best possible cost. Through the assorted embodiments of a fuel storage and blending system, multiple fuels can be safely and efficiently stored at pressures that allow for intelligent fuel blends to be consistently delivered with at least threshold pressure for a predetermined amount of time, such as one minute, one hour, or multiple hours.

Figure 10:
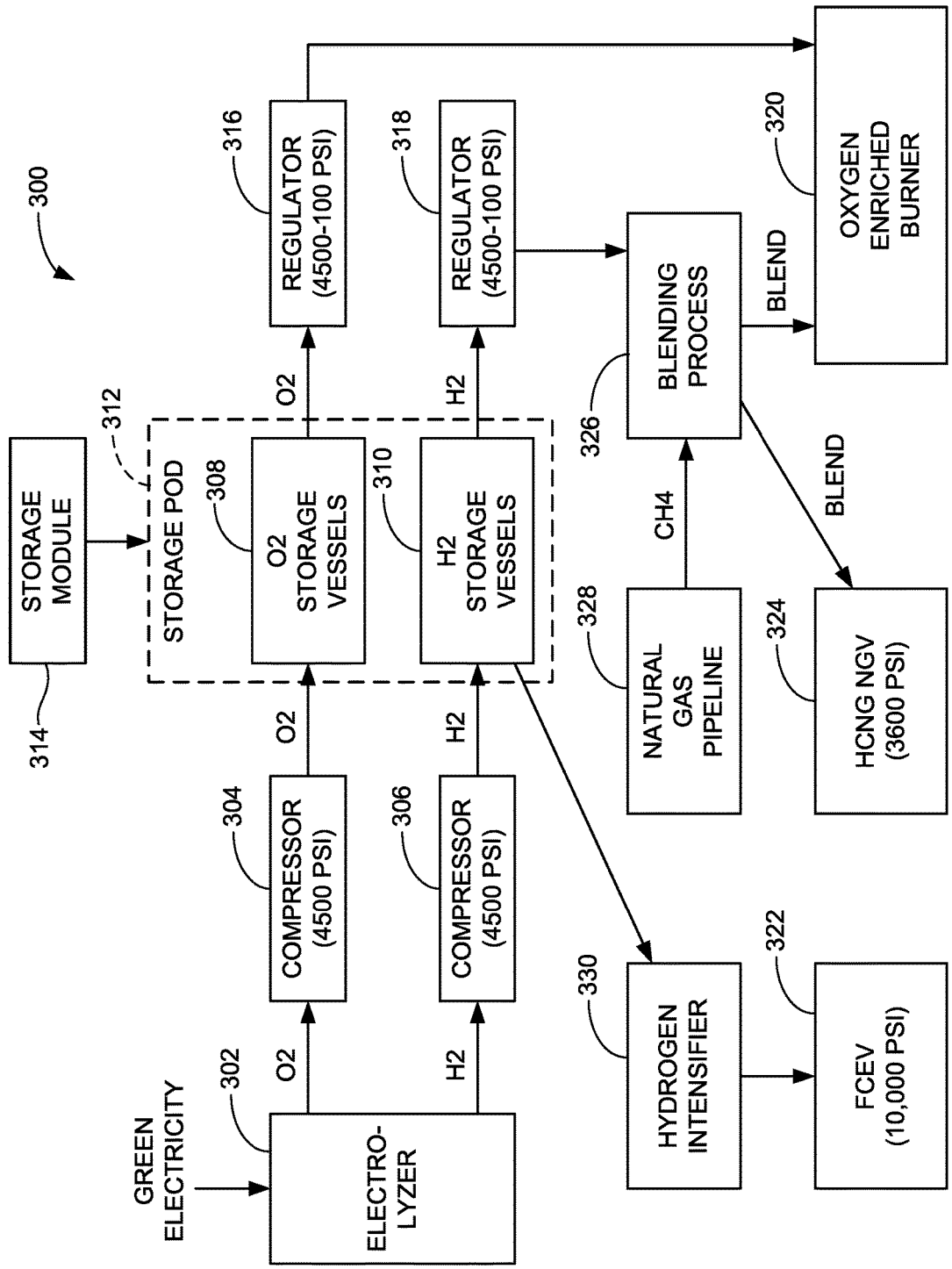
FIG. 10 provides another example power utilization system constructed and operated in accordance with further embodiments.

FIG. 10 provides another example power utilization system 300 constructed and operated in accordance with further embodiments. Various alternatives can be utilized. An electrolyzer 302 operates from a green electricity input to split water into respective oxygen (O2) and hydrogen (H2) streams. The streams are respectively compressed using compressors 304, 306 for storage in respective storage vessels 308, 310 of one or more storage pods 312 under the control of a storage module 314. The fuels are shown to be stored at a storage pressure of 4500 pounds per square inch (PSI), and regulators 316, 318 are used as desired to reduce the storage pressure to a lower delivery pressure such as 100 PSI. Other respective pressures can be used as required.

The system 300 can be configured to supply gases to various receiving mechanisms, such as an oxygen enriched burner 320, a pure hydrogen fuel cell electric vehicle (FCEV) 322 and/or a natural gas powered vehicle 324, such as a hydrogen compressed natural gas (HCNG) compatible vehicle. The burner 320 is fueled using a stream of regulated O2 as well as a blend of regulated H2 and natural gas (CH4) supplied by a blending process 326 and a natural gas pipeline (conduit) 328. The FCEV 322 is fueled using high pressure compressed hydrogen (such as at a pressure of 10,000 PSI) established by a hydrogen intensifier 330. The HCNG NGV is fueled using a blend of H2 and CH4 from the blending process 326 at another suitable fueling pressure such as 3600 PSI. It will be appreciated that the dispensed fuels to the respective vehicles 322, 324 may be supplied to a suitable storage tank of the associated vehicle.

The assorted embodiments of an energy supply, storage, and blending system, described herein, provides intelligent storage of gases that can be utilized to generate electricity and the intelligent blending of fuels to optimize operational performance and cost. The storage module can provide dynamic volumes and pressures for gas storage that can mitigate and/or prevent material embrittlement as well as maintain optimal supply of gases for blending and power generation purposes. The ability to interchange sleeves of a gas storage vessel further combats embrittlement without incurring large costs associating with replacing the entirety of a vessel. The operation of the blend module provides intelligent adaptations to changing cost, demand, supply, and operational efficiencies through the dynamic fuel ratio selection.

What is claimed is:
1. A method comprising:
  storing a first fuel and a second fuel in different storage vessels of a fuel storage pod in a fuel storage ratio in terms of total respective volumes of the first fuel and the second fuel, the fuel storage ratio established by a storage controller circuit of a storage module responsive to a predicted demand level, wherein the first fuel is hydrogen (H2);
  selecting a blended fuel ratio with a blend controller circuit of a blend module connected to the fuel storage pod in response to an imminent demand parameter of a selected combustion mechanism, the blended fuel ratio different from the fuel storage ratio; and supplying, to the selected combustion mechanism, a blended fuel comprising a mixture of the first fuel and the second fuel at the blended fuel ratio.

2. The method of claim 1, wherein the selected combustion mechanism is an internal combustion engine (ICE) of a motor vehicle.

3. The method of claim 2, wherein the second fuel comprises compressed natural gas (CNG) and the motor vehicle is characterized as a hydrogen compressed natural gas (HCNG) vehicle.

4. The method of claim 1, wherein the second fuel is a hydrocarbon.

5. The method of claim 4, wherein the hydrocarbon comprises at least a selected one of propane, butane, methane, hexane, gasoline or diesel.

6. The method of claim 1, wherein the first and second fuels are each stored in a pressurized gaseous state, and the different vessels of the fuel storage pod are subterranean pressurized vessels.

7. The method of claim 1, wherein the first and second fuels are each stored in a pressurized gaseous state, and at least one of the different vessels of the fuel storage pod is an above ground pressurized vessel.

8. The method of claim 1, further comprising a subsequent step of using the storage controller circuit to adjust the fuel storage ratio responsive to the blended fuel ratio by adjusting a steady-state storage pressure value of at least one of the first fuel or the second fuel from a first value to a second value.

9. The method of claim 1, further comprising a subsequent step of using the storage controller circuit to adjust the fuel storage ratio by changing a total number of respective storage vessels of at least one of the first fuel or the second fuel responsive to the blended fuel ratio.

10. The method of claim 1, further comprising blending the first fuel and the second fuel at a first pressure and increasing a delivery pressure of the blended fuel to a higher second pressure for dispensing to a storage tank associated with the selected combustion mechanism.

11. An apparatus comprising:

a storage module comprising a storage controller circuit;

a storage pod comprising at least one storage vessel configured to store a first overall volume of a first fuel and at least one storage vessel configured to store a second overall volume of a second fuel, the first and second overall volumes selected by the storage controller circuit responsive to a predicted demand level to establish a fuel storage ratio, wherein the first fuel is hydrogen (H2); and a blend module connected to the fuel storage pod and the storage module, the blend module comprising a blend controller circuit configured to select a blended fuel ratio between the first fuel and the second fuel responsive to an imminent demand parameter of a selected combustion mechanism, the blended fuel ratio different from the fuel storage ratio; and a dispenser mechanism configured to supply, to the selected combustion mechanism, a blended fuel comprising a mixture of the first fuel and the second fuel at the blended fuel ratio.

12. The apparatus of claim 11, wherein the selected combustion mechanism is an internal combustion engine (ICE) of a motor vehicle.

13. The apparatus of claim 11, wherein the second fuel is a hydrocarbon.

14. The apparatus of claim 11, wherein the second fuel is compressed natural gas.

15. The apparatus of claim 11, wherein the second fuel is oxygen, and the blended fuel further comprises an auxiliary fuel provided at a rate established by the blend controller circuit.

16. The apparatus of claim 11, wherein at least one of the storage vessels of the fuel storage pod is a subterranean vessel located below ground level.

17. The apparatus of claim 11, wherein at least one of the storage vessels of the fuel storage pod is located above ground level.

18. The apparatus of claim 11, wherein the storage controller circuit is further configured to subsequently adjust the fuel storage ratio responsive to the blended fuel ratio by adjusting a steady-state storage pressure value of at least one of the storage vessels within the storage pod from a first value to a different, second value.

19. The apparatus of claim 11, wherein the storage controller circuit of the storage module to adjust the fuel storage ratio by changing a total number of respective storage vessels of at least one of the first fuel or the second fuel responsive to the blended fuel ratio.

20. The apparatus of claim 11, further comprising blending the first fuel and the second fuel at a first pressure and increasing a delivery pressure of the blended fuel to a higher second pressure for dispensing to a storage tank associated with the selected combustion mechanism.

* * * * *